Figure 1:
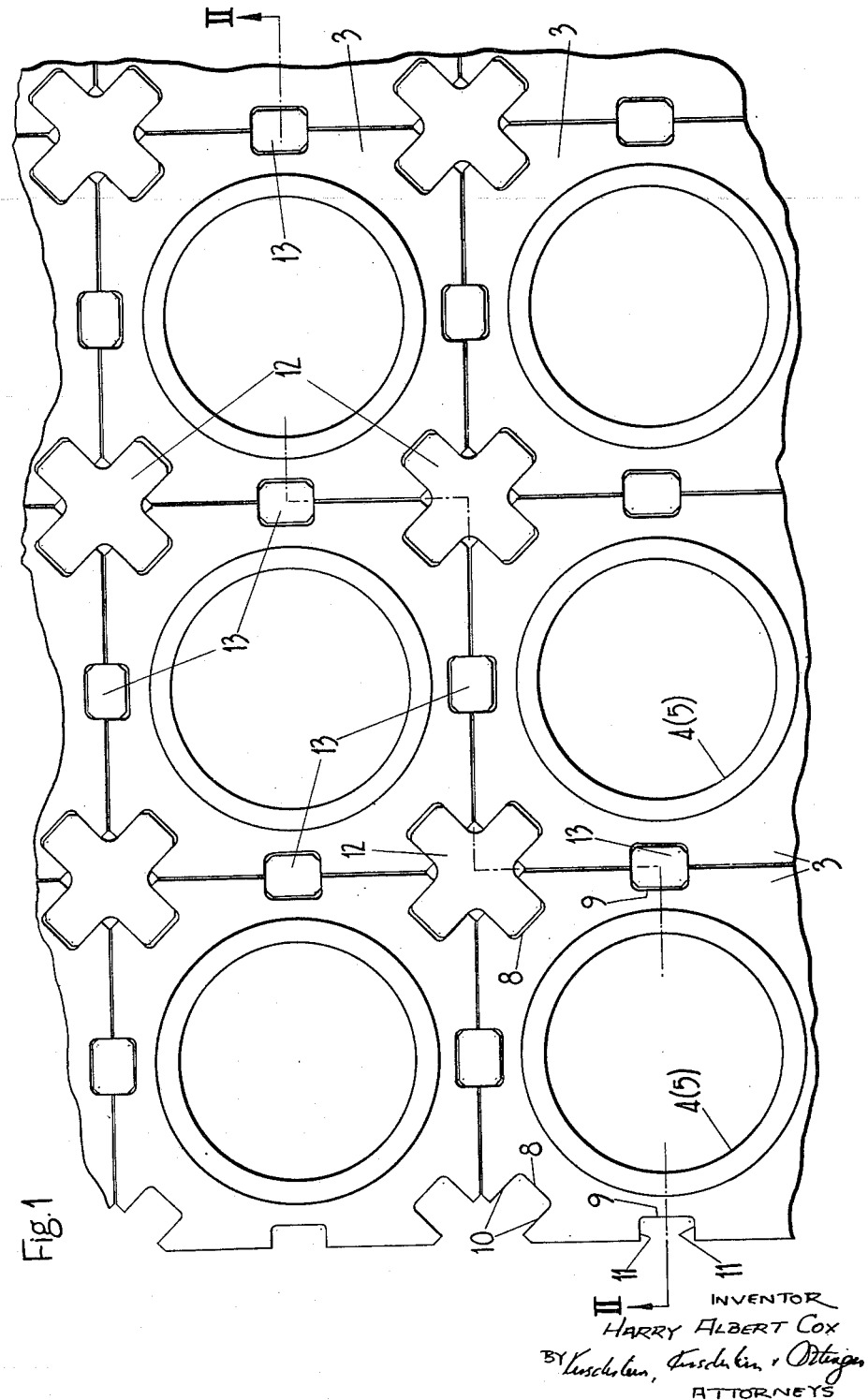

June 11, 1963 H. A. COX 3,093,568
MODERATOR CORE STRUCTURES FOR NUCLEAR REACTORS
Filed Sept. 15, 1960 2 Sheets-Sheet 1

INVENTOR
HARRY ALBERT COX
BY
ATTORNEYS

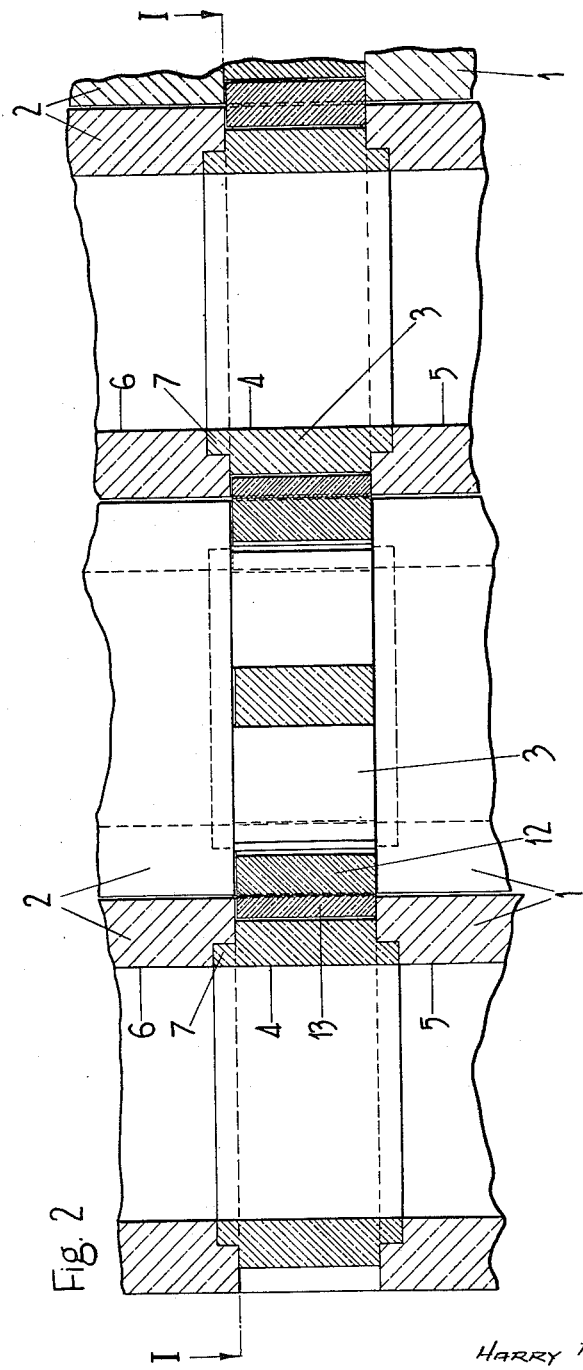

United States Patent Office 3,093,568
Patented June 11, 1963

3,093,568
MODERATOR CORE STRUCTURES FOR NUCLEAR REACTORS
Harry Albert Cox, Welling, Kent, England, assignor to The General Electric Company Limited, London, England
Filed Sept. 15, 1960, Ser. No. 56,282
Claims priority, application Great Britain Sept. 25, 1959
12 Claims. (Cl. 204—193.2)

This invention relates to moderator core structures for nuclear reactors, and more particularly to moderator core structures of the kind in which the main core is comprised of an assembly of lines of square section prismatic blocks of graphite arranged end to end, usually vertically or horizontally, some at least of the lines of blocks having holes therethrough which align to form channels for the reception of fuel elements. The main core will usually be arranged within reflector blocks and said channels arranged in a "lattice" spacing. Such a structure is used in the Calder Hall type of reactors, for instance, as described in British patent specifications Nos. 784,291 and 784,292.

Because of the so-called "Wigner changes" which take place when graphite material of the blocks is exposed to irradiation in a reactor, the overall dimensions of the blocks will diminish, the shrinkage of the blocks being greater towards the centre of the core. If the assembly of blocks is originally stabilised by the application of a surrounding constraint, such shrinkage would tend to cause contraction of the core and, even if the constraint continued to stabilise the core, the lattice spacing would change; it is probable that in practice however the difference between the shrinkages of outer zone and inner zone blocks would cause bridging of the blocks in the outer zone, whereupon the inner zone blocks would become unstable. There would then be a possibility that some at least of the lines of blocks would become distorted and it would become difficult or impossible to feed fuel elements into channels in such lines. It will be appreciated that since the numbers of such lines of blocks may run into hundreds, such distortion of the channels would be very serious. It is also evident that, from the point of view of performance of the reactor, changes of the lattice spacing of the core are undesirable.

It is an object of the present invention to provide a means of achieving stability of the core so as to obviate such disadvantages.

Thus in accordance with one aspect of the invention, in a core structure of the kind specified for a nuclear reactor, the said lines of blocks are positioned relative to each other by a combination of corner keys and side face keys. Preferably tile members are located in layers between adjacent blocks in each line, said corner and side face keys being arranged to interact with said tile members to locate the lines of blocks relative to each other.

In accordance with another aspect of the invention, in a core structure of the kind specified for a nuclear reactor, the blocks in each line are connected one to the next by spacing units, and stabilisation of the lattice spacing of the said channels in the core structure is secured by tile members of generally square section, in combination with corner keys and side face keys, said tile members being either integral with, or located relative to, said spacing units. A said corner key is preferably part of a cruciform or equivalent shape key member adapted to engage four keyways each formed substantially parallel to the appropriate diagonal of one of a group of four adjacent blocks (or tile members) and each side face key is preferably substantially of rectangular, possibly square, section engaging keyways formed substantially parallel to a line joining centres of channels (or holes) in adjoining blocks (or tile members).

In order that the invention may be more fully understood one arrangement of core structure will now be described by way of example with reference to the accompanying drawings of which FIGURE 1 shows a plan view on the line I—I in FIGURE 2 of part of the core and FIGURE 2 a side elevation on the line II—II in FIGURE 1.

In the drawings, square section graphite blocks 1 in one layer of the core structure are spigoted to the blocks 2 of similar section in the next layer by tile members 3 which have holes 4, the axes of which are in alignment with fuel element holes 5, 6 in the core blocks. The spigots comprise annular projections 7 on the tile members which locate, with reasonable tolerance, within recesses in the ends of the core blocks and in this way the alignment of the fuel channels is ensured. The relative dimensions indicated are for blocks approximately eight inches square cross-section by about thirty inches long. It will be appreciated that only a fragment of the core structure is shown, there being possibly hundreds of these lines of blocks in the complete structure.

The tile members 3 are of substantially the same cross-section as the blocks and are formed, as shown in FIGURE 1, with corner keyways 8 and central side face keyways 9. The bearing surfaces 10 of the corner keyways are formed substantially parallel to the associated diagonal of the tile member and the bearing surfaces 11 of the side face keyways are formed substantially at right angles to the associated side face. Cruciform keys 12 and rectangular keys 13 are arranged within the appropriate keyways, these keys being dimensioned to provide adequate clearances at the ends of the keyways and the arrangement is such that the tile members, and therefore the blocks, are keyed into position with adequate clearances at each face. Any expansion of the graphite material of the blocks or tile members, due to irradiation in operation in a reactor, is permitted. At the same time any shrinkage of the graphite from the same cause is permitted without distortion of the lattice spacing since all active keyway surfaces are nearly radial with respect to the axis for each line of blocks.

It is seen that with a reasonable fit at the active surfaces between keys and keyways, each tile member (and associated blocks) is (are) substantially rigidly positioned in space, making the structure highly stable. Thus individual lines of blocks cannot be moved nor can rows of these lines of blocks be moved parallel to the lattice planes nor diagonally.

It is evident that an inherently stable structure will be achieved even though certain of the keys (and, if desired, keyways) at each layer are omitted. It will be clear to those skilled in the art which keys may and which may not be omitted, and such an arrangement is included within the scope of the present invention.

In an alternative construction in accordance with the invention the tile members 3 and spigot projections 7 are made separately. In that case, the spigot projections would be formed as one continuous annular cylinder and the tile member would be formed with a bore fitting closely over this cylinder.

It will be evident that the type of structure involving tile members will be favoured, since the machining of keys and keyways will probably be simpler.

The keyways, or keys, in a structure in accordance with the invention need not extend the full length of the blocks (or tile members) and it is to be understood that the cruciform type of keys hereinbefore described may be of a composite nature, comprising, for instance, two separate crossed rectangular-section keys.

It will also be evident to those skilled in the art that there may be considerable differences of response to irradiation during operation of the core structure, and that, in consequence, a change in lateral alignment may occur at different layers of blocks or tile members. It will be desirable, therefore, that the length of keys, in relation to that of the keyways, should be such as to permit of this relative movement between adjacent lines of blocks. It will be noted that a clearance is indicated in FIGURE 2 of the drawings illustrating the particular core structure which has been described, but the relative clearances may be varied at different parts of the core and may, of course, be of considerably greater proportions.

It is possible for certain of the side face keys to be formed integrally with one of the blocks, or tile members, with which they are associated, but the point of clearances will also need to be considered in such cases also.

In a structure incorporating tile members, such as that described above, it will be evident that, unless measures are taken to avoid it, there is the possibility that individual blocks may rotate about their axes. If this is undesirable, one effective measure which could be taken would be to arrange one key in the case of each block to extend into a keyway in the block itself; other equally effective measures will be evident in particular cases.

Other alternatives within the scope of the invention will be apparent.

I claim:

1. A main core structure for a nuclear reactor comprising an assembly of basically square section prismatic blocks of graphite arranged in lines substantially end to end, some at least of said lines of blocks having holes therethrough which align to form channels for the reception of fuel elements, and key and keyway restraint means at substantially all side faces and corners of the lines of blocks, interengaging faces of parts of said restraint means being arranged to position said lines of blocks relative to each other, and the change-due-to-neutron-irradiation characteristics of parts of each restraint means being substantially similar, at least in the direction at right angles to the common positioning faces of said parts.

2. A main core structure for a nuclear reactor in accordance with claim 1, wherein the key restraint means at corner positions are of substantially cruciform shape, and are constructed to engage keyway means in four adjacent lines of blocks.

3. A main core structure for a nuclear reactor as claimed in claim 1, wherein some at least of the key restraint means are formed integrally with the blocks.

4. A main core structure for a nuclear reactor as claimed in claim 1, wherein at least some of the key restraint means at corner positions are formed as composite constructions.

5. A main core structure for a nuclear reactor comprising an assembly of lines of substantially square section blocks of graphite arranged substantially end to end, some at least of said lines of blocks having holes therethrough which align to form channels for the reception of fuel elements, spacing units, said spacing units each connecting one block to the next, tile members of graphite of basically square section, each tile member being associated with one of said spacing units, and key and keyway restraint means at substantially all side faces and corners of said tile members, interengaging faces of parts of said restraint means being arranged to position said spacing units, and therefore said lines of blocks, relative to each other, and the change-due-to-neutron-irradiation characteristics of parts of each restraint means being substantially similar, at least in the direction at right angles to the common positioning faces of said parts.

6. A main core structure for a nuclear reactor in accordance with claim 5, wherein the key restraint means at corner positions of the tile members are of substantially cruciform shape, and are constructed to engage keyway means in four adjacent tile members.

7. A main core structure for a nuclear reactor as claimed in claim 5, wherein some at least of the key restraint means are formed integrally with the tile members.

8. A main core structure for a nuclear reactor comprising an assembly of lines of substantially square section blocks of graphite arranged substantially end to end, some at least of said lines of blocks having holes therethrough which align to form channels for the reception of fuel elements, graphite tile members, said tile members connecting each block to the next and being of basically square section, and key and keyway restraint means at substantially all side faces and corners of said tile members, interengaging faces of parts of said restraint means being arranged to position said tile members, and therefore said lines of blocks, relative to each other, and the change-due-to-neutron-irradiation characteristics of parts of each restraint means being substantially similar, at least in the direction at right angles to the common positioning faces of said parts.

9. A main core structure for a nuclear reactor in accordance with claim 8, wherein the key restraint means at corner positions of the tile members are of substantially cruciform shape, and are constructed to engage keyway means in four adjacent tile members.

10. A main core structure for a nuclear reactor as claimed in claim 8, wherein some at least of the key restraint means are formed integrally with the tile members.

11. A main core structure for a nuclear reactor comprising an assembly of lines of substantially square section blocks of graphite arranged substantially end to end, some at least of said lines of blocks having holes therethrough which align to form channels for the reception of fuel elements, spacing units, said spacing units each connecting one block to the next, tile members of graphite of basically square sections, each tile member being pivotally mounted with respect to one of said spacing units, and key and keyway restraint means at substantially all side faces and corners of said tile members, interengaging faces of parts of said restraint means being arranged to position said spacing units, and therefore said lines of blocks, relative to each other, and the change-due-to-neutron-irradiation characteristics of parts of each restraint means being substantially similar, at least in the direction at right angles to the common position faces of said parts.

12. A main core structure for a nuclear reactor in accordance with claim 11, wherein the key restraint means at corner positions of the tile members are of substantially cruciform shape, and are adapted to engage keyway means in four adjacent tile members.

References Cited in the file of this patent

UNITED STATES PATENTS

| | | |
|---|---|---|
| 1,472,536 | Thomson | Oct. 30, 1923 |
| 2,852,457 | Long et al. | Sept. 16, 1958 |

FOREIGN PATENTS

| | | |
|---|---|---|
| 1,142,297 | France | Mar. 25, 1957 |
| 1,175,312 | France | Nov. 10, 1958 |
| 1,214,246 | France | Nov. 9, 1959 |